(12) United States Patent
Leu

(10) Patent No.: US 7,957,161 B2
(45) Date of Patent: Jun. 7, 2011

(54) POWER CONVERTERS

(75) Inventor: Ching-Shan Leu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 352 days.

(21) Appl. No.: 12/397,205

(22) Filed: Mar. 3, 2009

(65) Prior Publication Data

US 2010/0226154 A1 Sep. 9, 2010

(51) Int. Cl.
*H02M 3/335* (2006.01)
(52) U.S. Cl. ........................... 363/21.03; 363/17
(58) Field of Classification Search .............. 363/16, 363/17, 20, 21.01–20.04, 56.01, 56.02, 97, 363/98, 131, 132
See application file for complete search history.

(56) References Cited

U.S. PATENT DOCUMENTS

| | | | |
|---|---|---|---|
| 4,864,479 A | 9/1989 | Steigerwald et al. | |
| 5,198,969 A | 3/1993 | Redl et al. | |
| 5,946,200 A | 8/1999 | Kim et al. | |
| 6,466,458 B2 | 10/2002 | Zhang et al. | |
| 6,487,094 B1 * | 11/2002 | Weng et al. | 363/21.12 |
| 6,504,739 B2 | 1/2003 | Phadke | |
| 6,961,254 B2 * | 11/2005 | Tamura | 363/89 |
| 7,551,459 B1 * | 6/2009 | Wittenbreder, Jr. | 363/21.06 |

* cited by examiner

*Primary Examiner* — Matthew V Nguyen

(57) ABSTRACT

A power converter capable of improving converter's efficiency and achieving zero-voltage-switching is provided, in which a first series circuit is connected in parallel with a direct current (DC) power supply and has a first inductor, a first primary winding, first and second switching elements connected in series. A second series circuit is connected in parallel with the DC power supply and has third and fourth switching elements, a first capacitor, a second primary winding and a second inductor connected in series. A second capacitor is connected between a first node between the first primary winding and the first switching element in the first series circuit and a second node between the fourth switching element and the second primary winding in the second series circuit. A third node between the first and second switching elements is connected to a fourth node within the second series circuit.

17 Claims, 15 Drawing Sheets

POWER CONVERTERS

BACKGROUND OF THE INVENTION

1. Field of the Invention

The invention relates to power converters, and more particularly, to power inverters capable of achieving zero-voltage-switching (ZVS) to improve converter's efficiency and reducing input current ripple to alleviate the electromagnetic interference intensity (EMI).

2. Description of the Related Art

To reduce the size and weight with faster dynamic response, PWM power converters are operated at high frequencies. However, there are several inherent problems, such as the increase of the switching losses and the parasitic oscillation noise. Thus, the operating frequency of PWM converters is limited. To alleviate these problems, soft-switching techniques, zero-voltage-switching (ZVS) and/or zero-current switching, are widely used to minimize the switching losses. Employing phase shift modulation or asymmetrical pulse width modulation scheme, several high frequency zero-voltage full-bridge topologies for high power applications were disclosed.

For example, U.S. Pat. No. 6,466,458, issued to Zhang et al, discloses an asymmetrical full bridge DC-to-DC converter with a linear control characteristic of output voltage to switching duty cycle and an optimal reset of the transformer core. U.S. Pat. No. 5,198,969, issued to Redl et al, discloses a phase-shifted full bridge DC-to-DC converter capable of reducing switching losses of transistors and rectifier diodes. Further, U.S. Pat. No. 4,864,479, U.S. Pat. No. 5,946,200 and U.S. Pat. No. 6,504,739 all disclose full bridge DC-to-DC converters capable of reducing switching losses. However, the above mentioned soft switching full-bridge converters have a larger pulsating input current ripple inherent problem. In addition to the dv/dt phenomenon, the pulsating input current ripples, di/dt, causes the power converters having EMI problems. The lower the pulsating current ripples, the lower the EMI intensity to be dealt with. Consequently, a smaller EMI filter can be used to meet the EMI regulations. Moreover, a lower RMS value of the input current can be also achieved resulting in improving the converter efficiency. Therefore, low input current ripple power converter has additional advantage and becomes one of the design criteria of concern.

Thus, there is a need for a high frequency soft switching power converter with a lower input current ripple and high conversion efficiency.

BRIEF SUMMARY OF THE INVENTION

The invention provides an embodiment of a power converter consisting of two series-connected circuitries, connected in parallel with the DC power supply, and one clamp capacitor. The first series circuit comprises a first inductor, a first primary winding, a first switching element and a second switching element connected in series. The second series circuit comprises a third switching element, a first capacitor, a fourth switching element, a second primary winding and a second inductor connected in series. The clamp capacitor is connected between a first node within the first series circuit and a second node within the second series circuit. The first node is between the first primary winding and the first switching element, the second node is between the fourth switching element and the second primary winding, and a third node between the first and second switching elements is connected to a fourth node within the second series circuit.

The invention provides another embodiment of a power converter consisting of two series-connected circuits, connected in parallel with the series-connected DC power supply and first inductor, and two clamp capacitors. The first series circuit, comprises a second inductor, a first primary winding, a first switching element, a second switching element, a second primary winding and a third inductor connected in series. The second series circuit comprises a fourth inductor, a third primary winding, a third switching element, a first capacitor, a fourth switching element, a fourth primary winding and a fifth inductor connected in series. The first clamp capacitor is connected between a first node within the first series circuit and a second node within the second series circuit, in which the first node is between the first primary winding and the first switching element, and the second node is between the fourth switching element and the fourth primary winding. The second clamp capacitor is connected between a third node within the first series circuit and a fourth node within the second series circuit, in which the third node is between the second switching element and the second primary winding, the fourth node is between the third primary winding and the third switching element, and a fifth node between the first and second switching elements is connected to a sixth node within the second series circuit.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
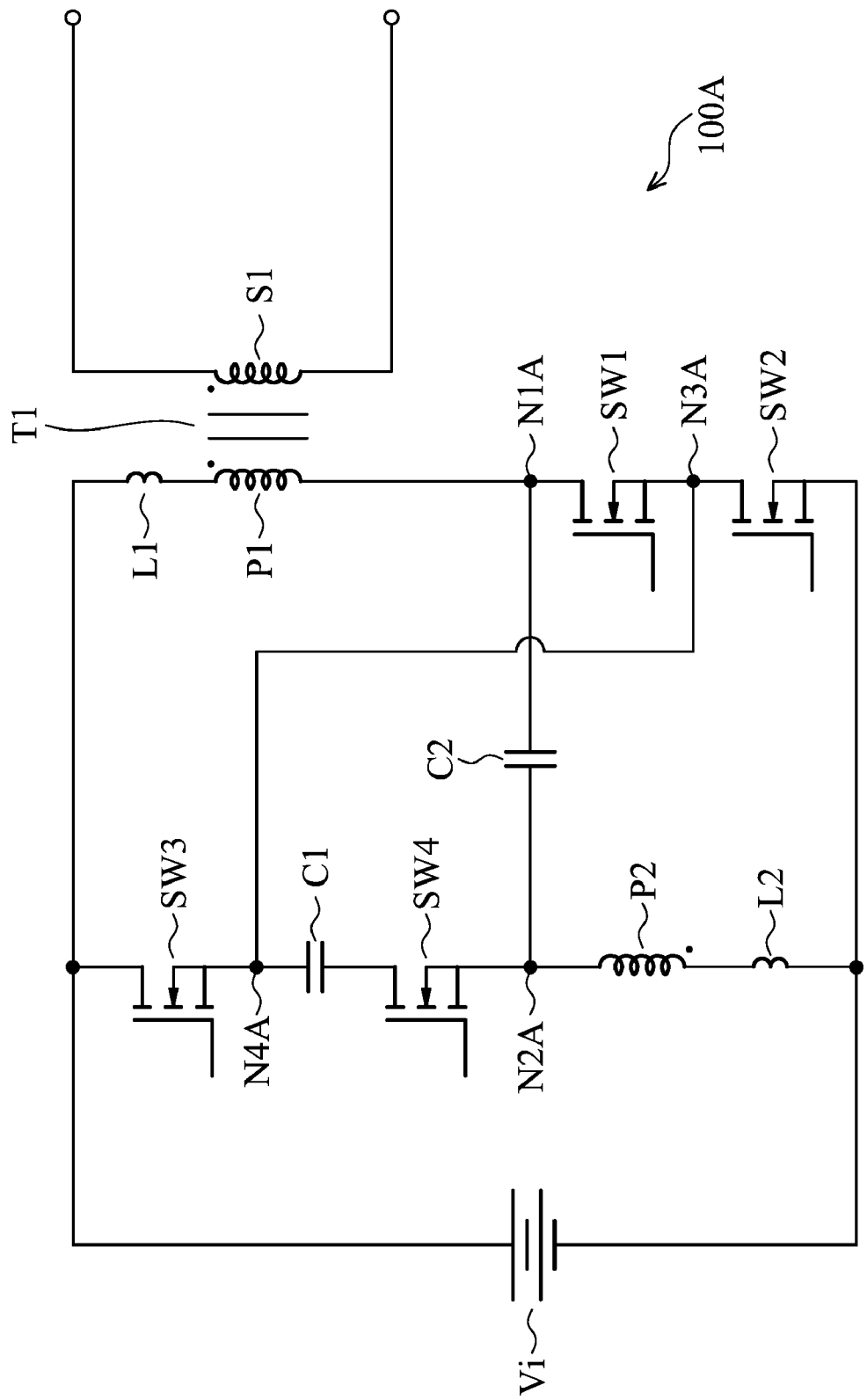
FIG. 1 shows an embodiment of a power converter according to the invention.

FIG. 1 shows an embodiment of a power converter according to the invention. As shown, a power converter 100A comprises a transformer T1, switching elements SW1~SW4, capacitors C1 and C2, and inductors L1 and L2. The transformer T1 comprises two primary windings P1 and P2 and at least one secondary winding S1, in which the inductor L1, the primary winding P1 and the switching elements SW1 and SW2 are connected in series to form a first series circuit, and the switching element SW3, the capacitor C1, the switching element SW4, the primary winding P2 and the inductor L2 are connected in series to form a second series circuit. Both of the first and second series circuits are connected to a direct current (DC) power supply Vi in parallel. The inductors L1 and L2 can be parasitic inductors or external inductors.

The inductor L1 is connected between a first electrode (i.e., the positive electrode) of the DC power supply Vi and the first terminal of the primary winding P1, and the primary winding P1 has a first terminal connected to the inductor L1 and a second terminal connected to a node N1A. The switching element SW1 has a first terminal connected to the node N1A and a second terminal connected to a node N3A, and the switching element SW2 has a first terminal connected to the node N3A and a second terminal connected to a second electrode (i.e., the negative electrode) of the DC power supply Vi.

The switching element SW3 has a first terminal connected to the first electrode of the DC power supply Vi, and a second terminal connected to a node N4A, and the capacitor C1 has a first terminal connected to the node N4A and a second terminal connected to the switching element SW4. The switching element SW4 has a first terminal connected to the second terminal of the capacitor C1 and a second terminal connected to a node N2A. The primary winding P2 has a first terminal connected to the node N2A and a second terminal connected to the inductor L2, and the inductor L2 is connected between the second terminal of the primary winding P2, and the second electrode of the DC power supply Vi. In addition, the capacitor C2 is connected between the nodes N1A and N2A, and the nodes N3A and N4A are connected together.

Figure 2:
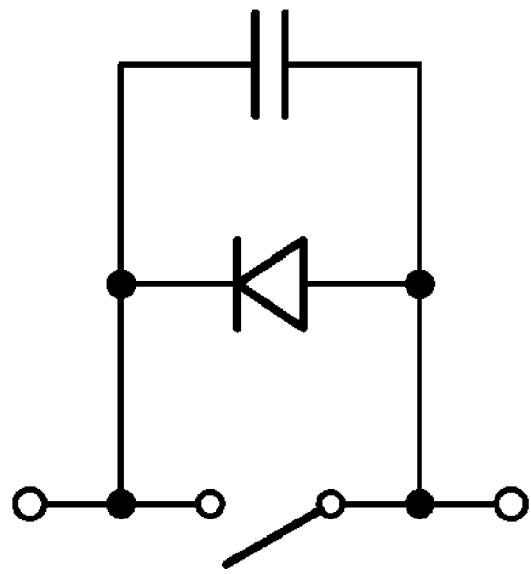
FIG. 2 shows an equivalent diagram of the switching elements shown in FIG. 1.
Figure 2:
Figure 2:
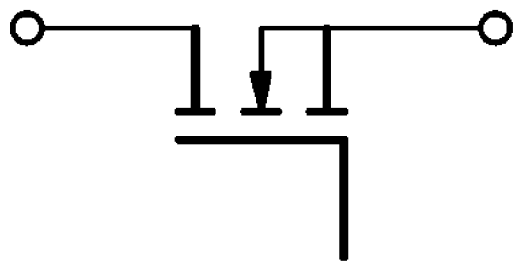
Figure 3:
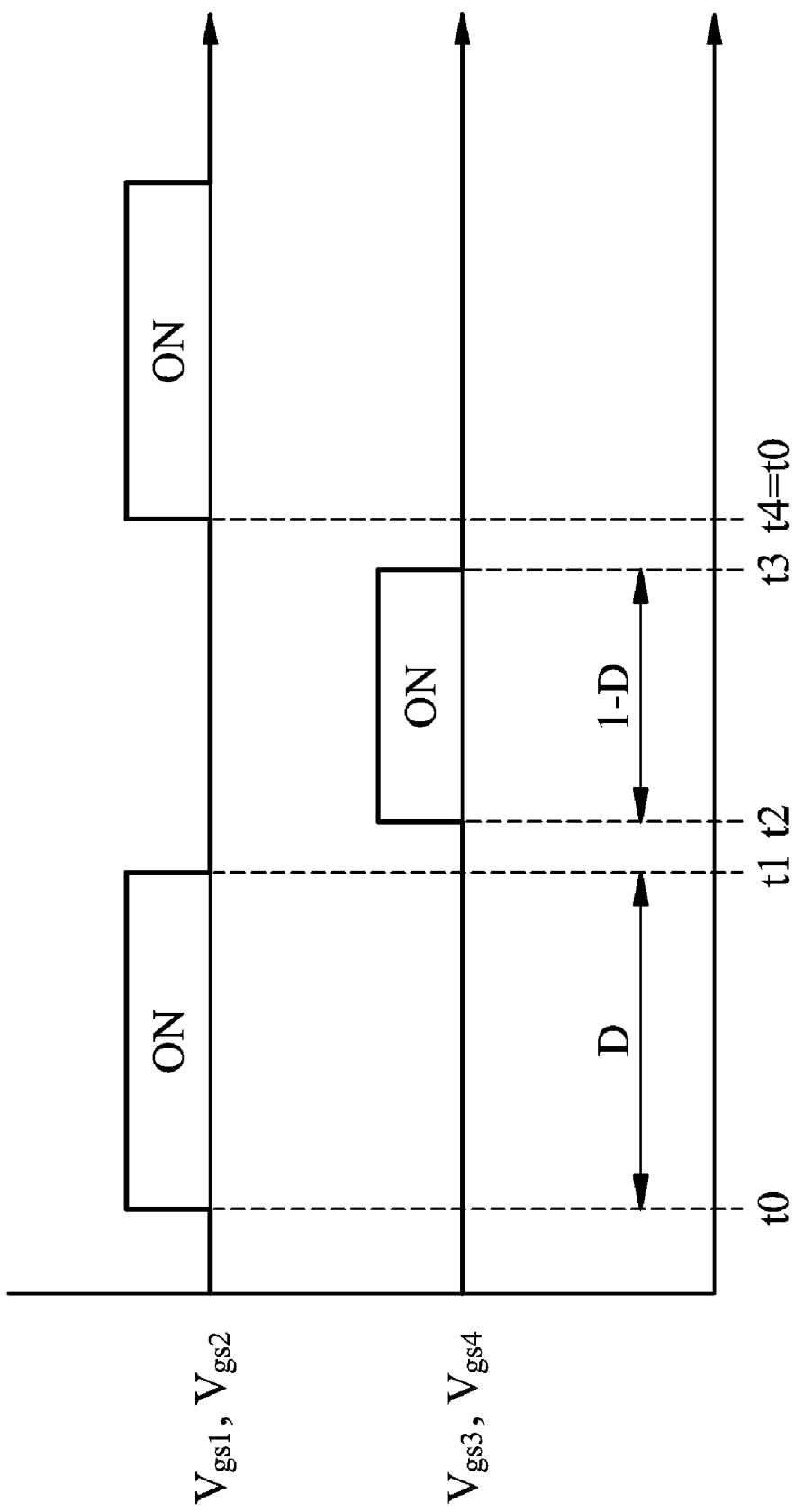
FIG. 3 shows the gate driver signal's waveforms of the power converter operated in an asymmetrical mode.

FIG. 2 shows an equivalent diagram of the switching elements shown in FIG. 1. As shown, a switching element SWX can be regarded as a switch, a body diode and a capacitor connected in parallel. In some embodiments, the switching elements SW1~SW4 can also be implemented by IGBTs, MOS transistors or even electromechanical or micro-machined switches, with parallel-connected diodes. The switching elements SW1~SW4 are controlled by control signals provided by a converter controller, such as a phase shift modulation controller or a pulse width asymmetrical modulation controller, thereby converting the DC power supply Vi into an alternating current (AC) output at the secondary winding S1. FIG. 3 shows the gate driver signal's waveforms of the power converter operated in an asymmetrical mode. For example, the voltage Vgs1 is the gate driver signal of the switching element SW1, the voltage Vgs2 is the gate driver signal of the switching element SW2, and so on. It should be noted that, when the switching elements SW1~SW4 are turned off, the DC power supply Vi, the inductor L1, the primary winding P1, the capacitor C2, the primary winding P2, and the inductor L2 form a loop. Because polarity of the primaries P1 and P2 are opposite, the average voltage of the capacitor C2 can be equal to the DC supply voltage Vi. The operation waveforms will be described with reference to FIGS. 4A~4D by following time intervals:

[t0,t1]

Figure 4A:
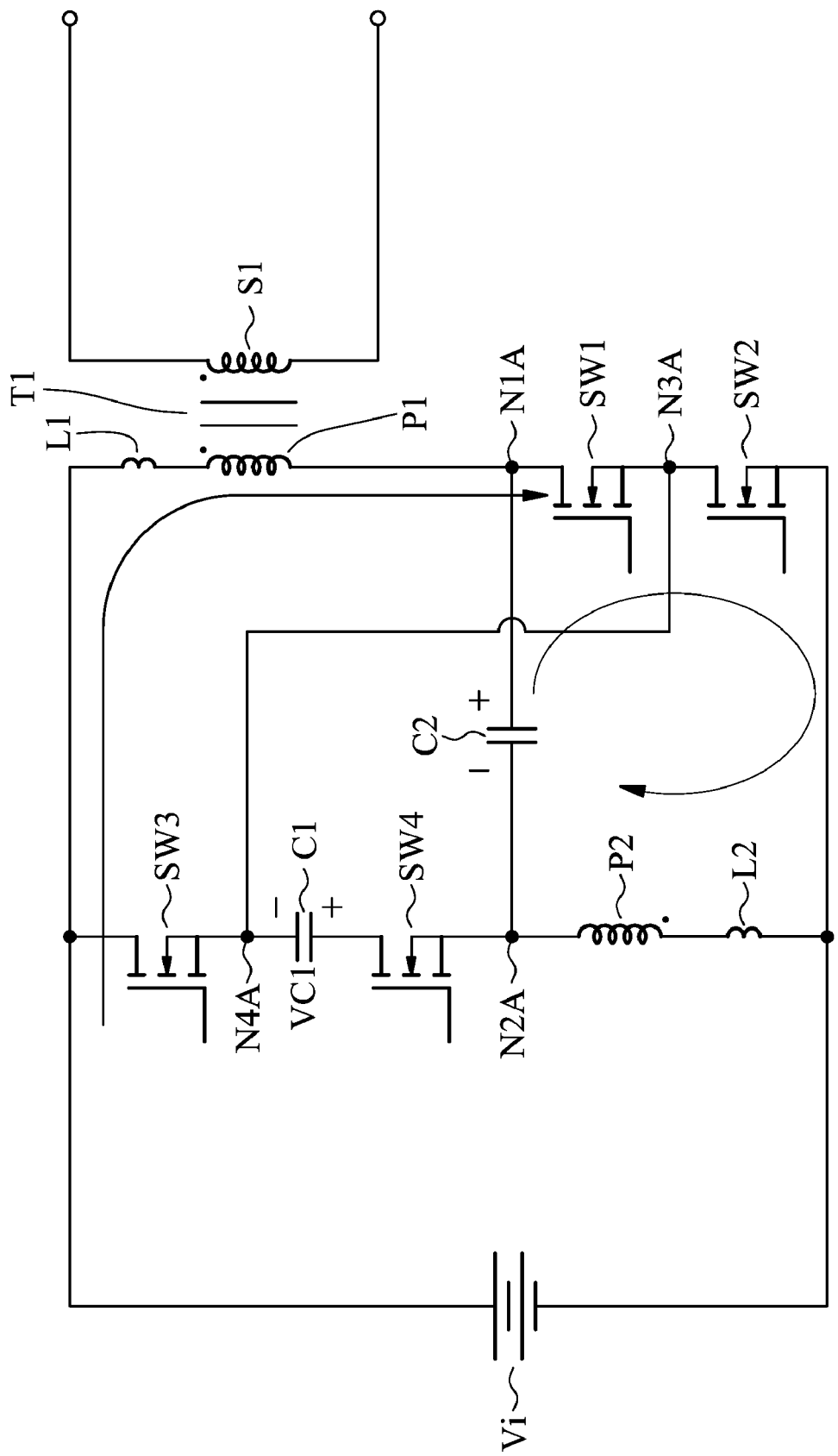
FIGS. 4A~4D show operation diagrams of the power converter operated in the asymmetrical mode.

Referring to FIG. 4A, at time t0, the switching elements SW1 and SW2 are turned on under zero-voltage-switching condition and the switching elements SW3 and SW4 are remained off. The DC power supply Vi, the inductor L1, the primary winding P1, the switching element SW1 and the switching element SW2 form a first loop. The capacitor C2, the switching element SW1, the switching element SW2, the inductor L2 and the primary winding P2 form a second loop. Both primary windings P1 and P2 are activated, such that the magnetizing currents of the transformer T1 increase linearly. In addition, the input ripple can be reduced because energy delivered to the secondary winding S1 is provided by both of the DC power supply Vi and the average voltage of the capacitor C2. At this time, the voltage stress cross the switching element SW3 is the DC power supply Vi, and the voltage stress across the switching element SW4 is Vi+VC1.

[t1,t2]

Figure 4B:
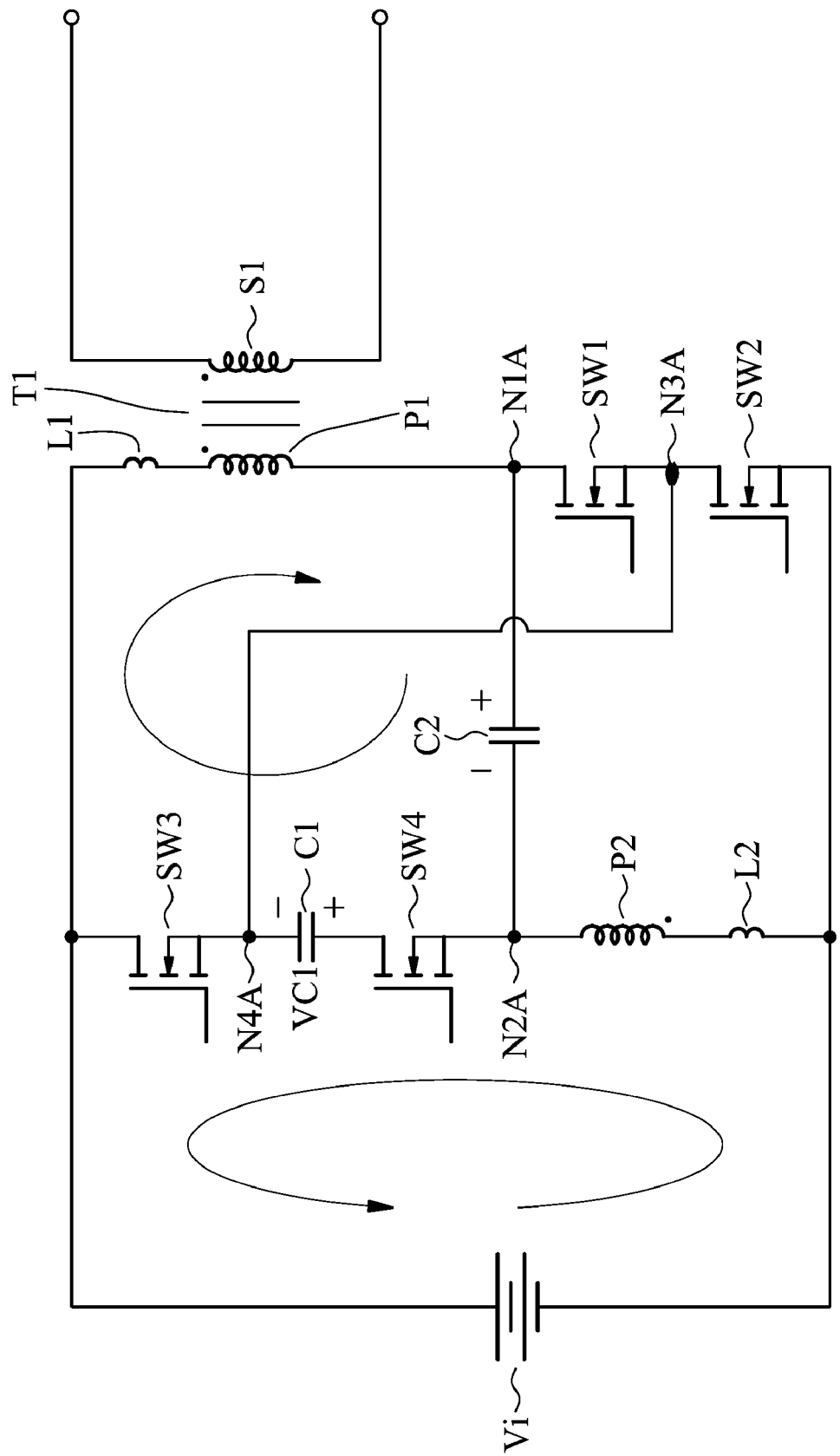

Referring to FIG. 4B, at time t1, the switching elements SW1 and SW2 are turned off. The voltage at the node N1A is increased, and magnetizing currents discharge the parasitic capacitors of the switching elements SW3 and SW4. Finally, the parasitic capacitors of the switching elements SW3 and SW4 are discharged completely and the body diodes of which are turned on.

[t2, t3]

Figure 4C:
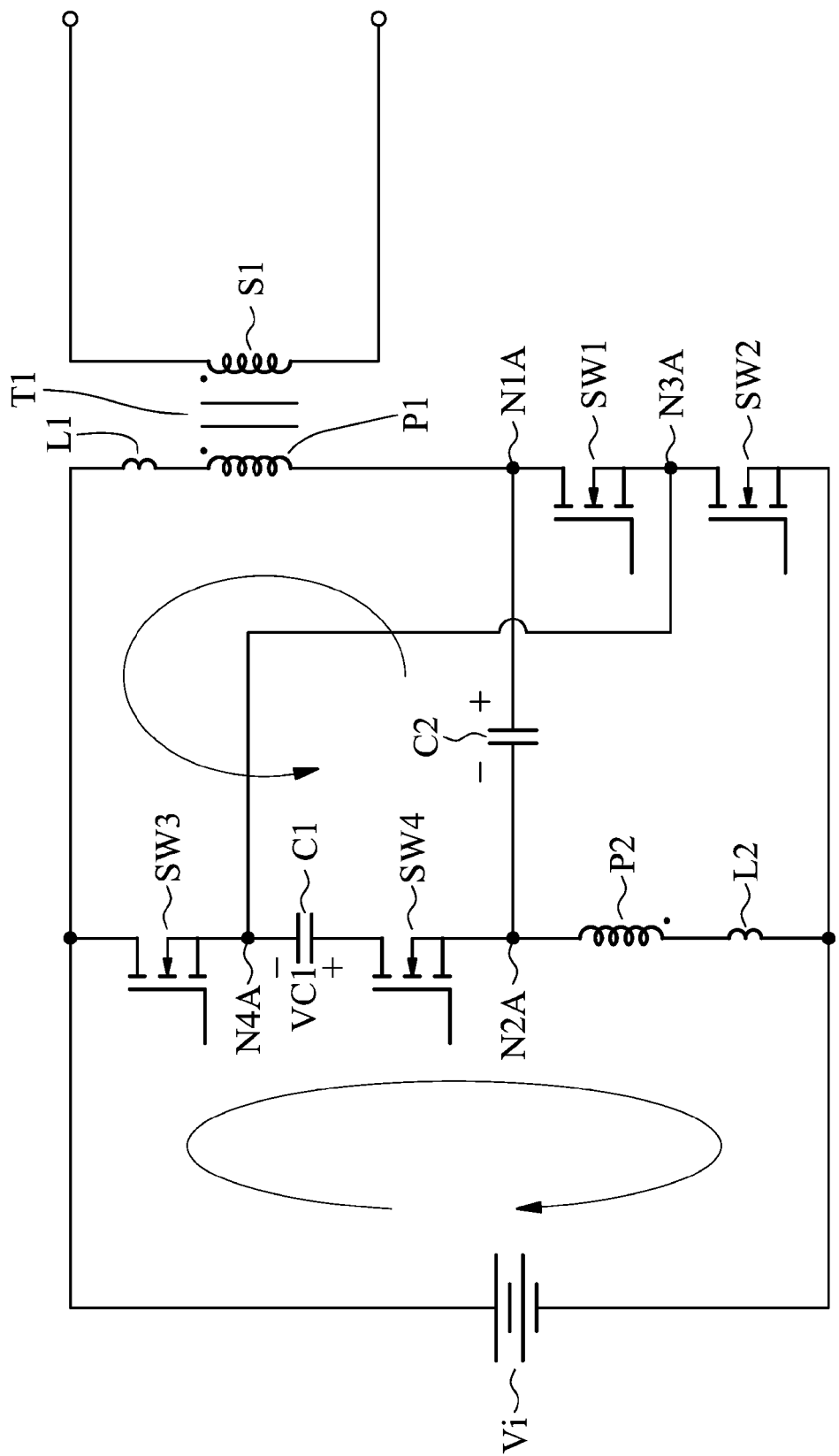

Referring to FIG. 4C, at time t2, the switching elements SW3 and SW4 are turned on under zero-voltage-switching condition. The DC power supply voltage Vi, the switching element SW3, the capacitor C1, the switching element SW4, the primary winding P2 and the inductor L2 form a first loop. The capacitor C2, the primary winding P1, the inductor L1, the switching element SW3, the capacitor C1 and the switching element SW4 form a second loop. The reset voltage –(Vi+VC1) is applied to the primary windings P1 and P2, both primary windings are activated such that the magnetizing currents are decreased linearly and finally reversed. Similarly, energy delivered to the secondary winding S1 is provided by the DC power supply Vi and the average voltage of the capacitor C2. At this time, the voltage stress across the switching element SW2 is the DC power supply Vi, and the voltage stress across the switching element SW1 is Vi+VC1.

[t3, t4]

Figure 4D:
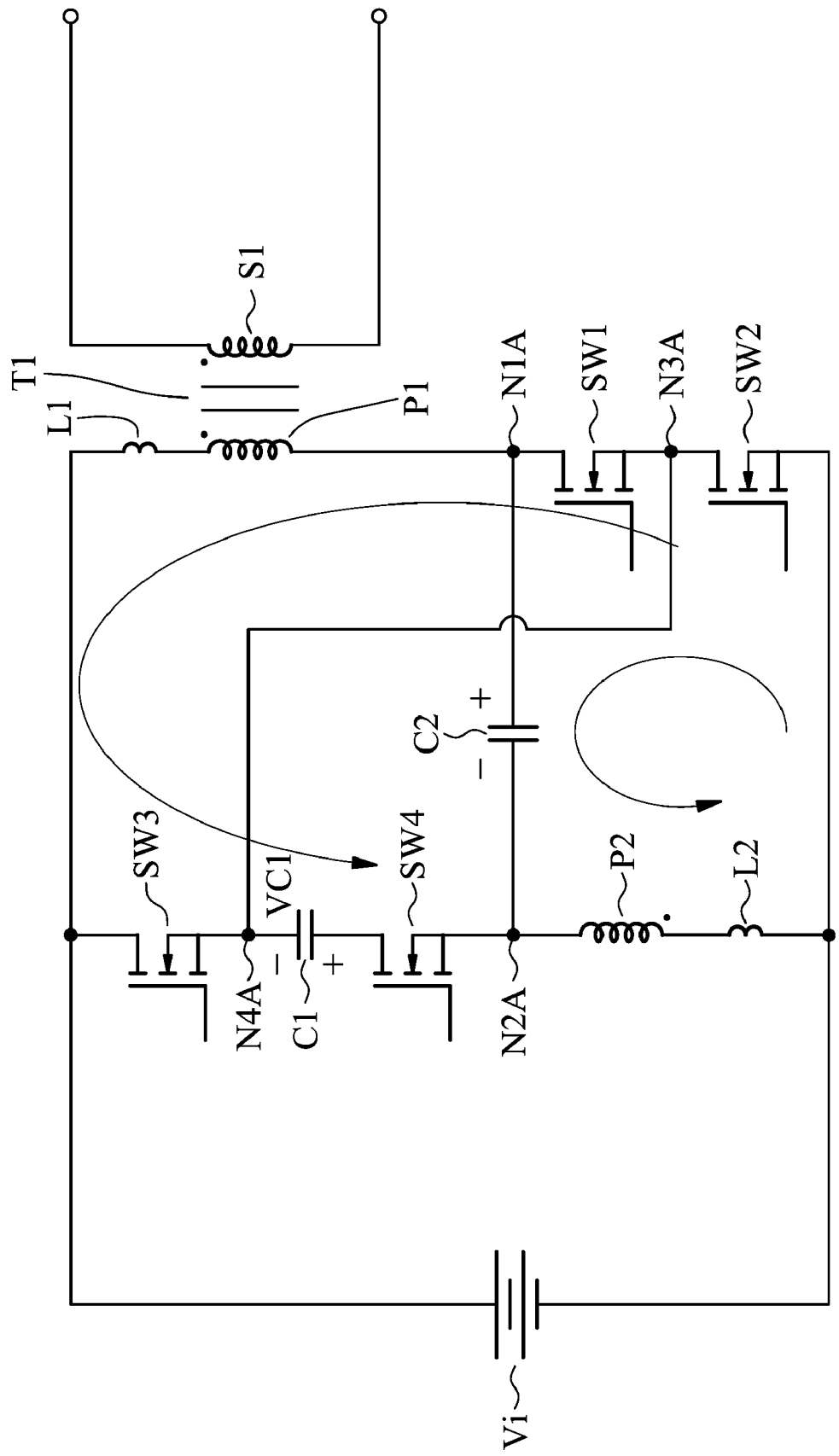

Referring to FIG. 4D, at time t3, the switching elements SW3 and SW4 are turned off. The voltage at the node N1A is decreased and magnetizing currents discharge the parasitic capacitors of the switching elements SW1 and SW2. Finally, the parasitic capacitors of the switching elements SW1 and SW2 are discharged completely and the body diodes of which are turned on. At time t4, the switching SW1 and SW2 are turned on to resume a new switching cycle.

In a steady operation, the relationship between the reset voltage and the duty cycle can be expressed as:

$$Vi + VC1 = \frac{D}{(1-D)} \times Vi$$

For well understanding of operation of the power converter operated in an asymmetrical mode of the invention, operation features of this power converter are described as follows. First, the reset voltage is changeable. With the decrease of the DC power supply Vi, the duty cycle increase, and the reset voltage increases; the reset time shortens. Hence, the maximum duty cycle can be larger than 50% in low input, and the conversion efficiency can be improved accordingly. Second, the switching elements SW1~SW4 are switched under zero-voltage-switching, and thus, the conversion efficiency can also improved. Third, voltage stresses of the switching elements SW2 and SW3 are equal to the DC power supply Vi, and those of the switching elements SW1 and SW4 are equal to voltage Vi+VC1. Thus, the power converter 100A is suitable for high-input voltage applications.

Figure 5:
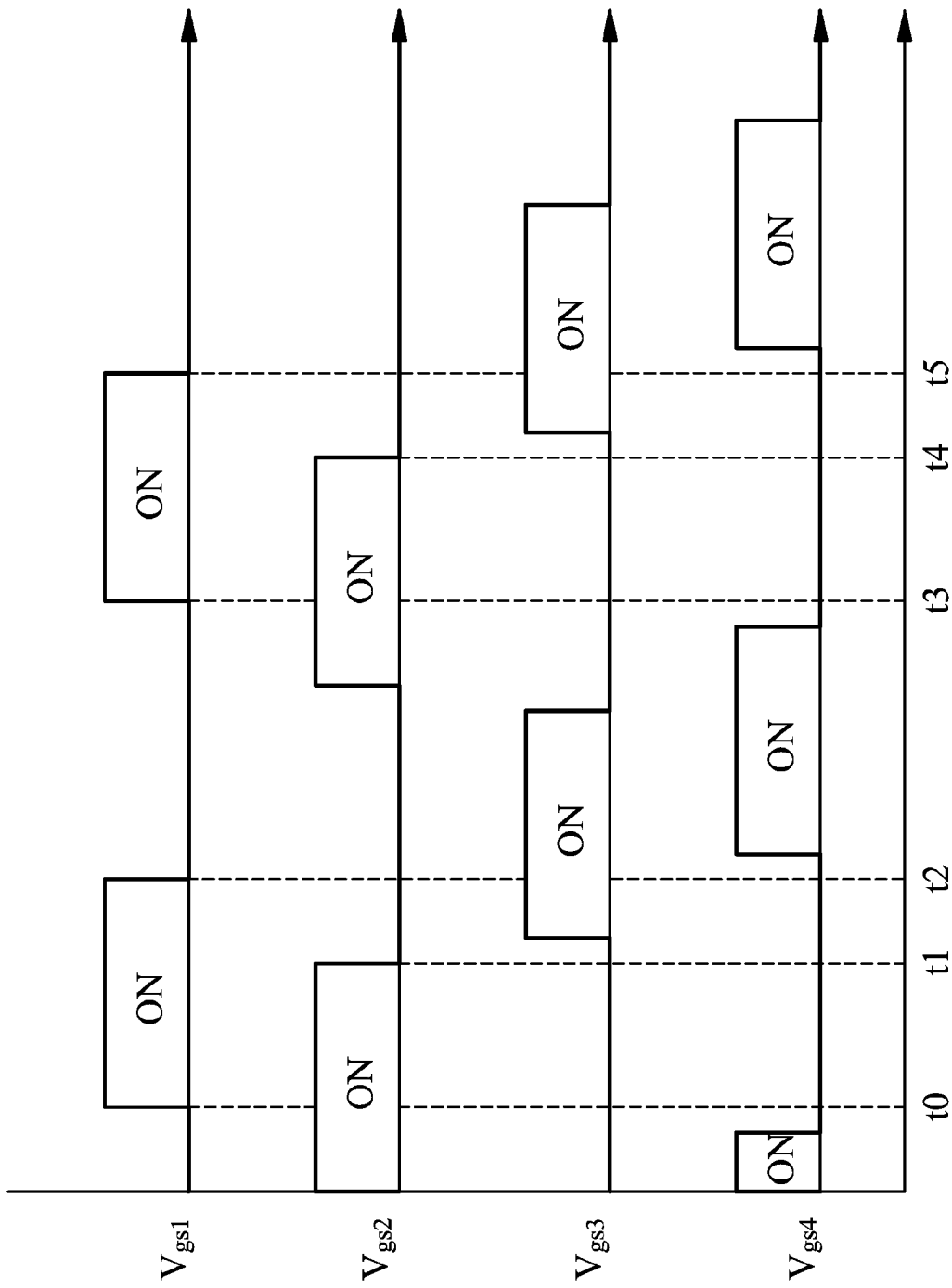
FIG. 5 shows the gate driver signal's waveforms of the power converter when operated in a phase shift mode.

The power converter 100A can also be operated in a phase shift mode by a phase shift modulation controller. FIG. 5 shows the gate driver signal's waveforms of the power converter when operated in a phase shift mode. Operations of the power converter 100A operated in the phase shift mode are similar to that operated in the asymmetrical mode, and thus are omitted for briefly.

Figure 6:
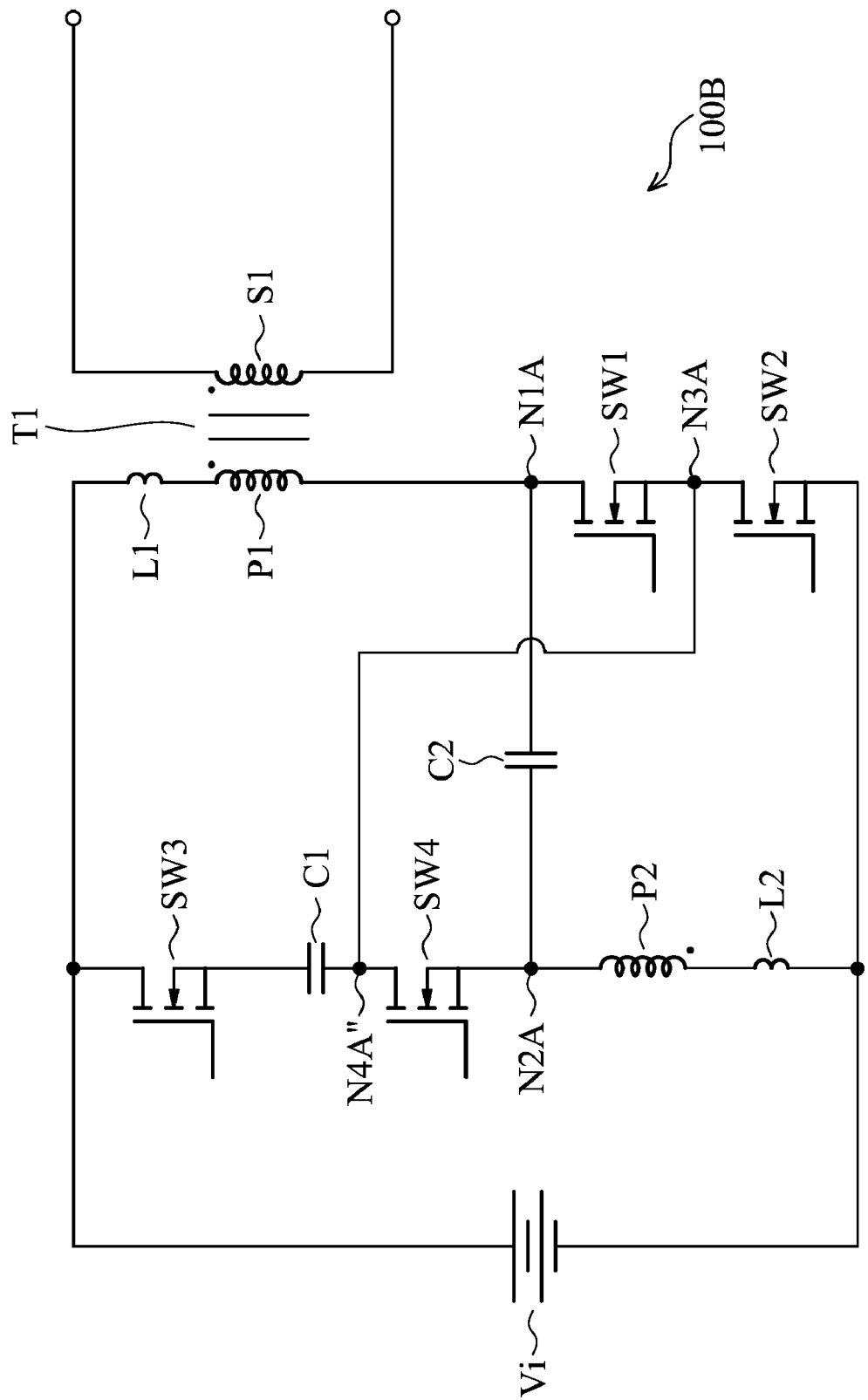
FIG. 6 shows another embodiment of the power converter according to the invention.

FIG. 6 shows another embodiment of the power converter according to the invention. As shown, the power converter 100B is similar to the power converter 100A, differing only, in that the node N3A is connected to the node N4A" between the capacitor C1 and the switching element SW4 rather than the node N4A between the capacitor C1 and the switching element SW3. Operations of the power converter 100B are similar to those of power converter 100A, and thus are omitted for simplification.

Figure 7:
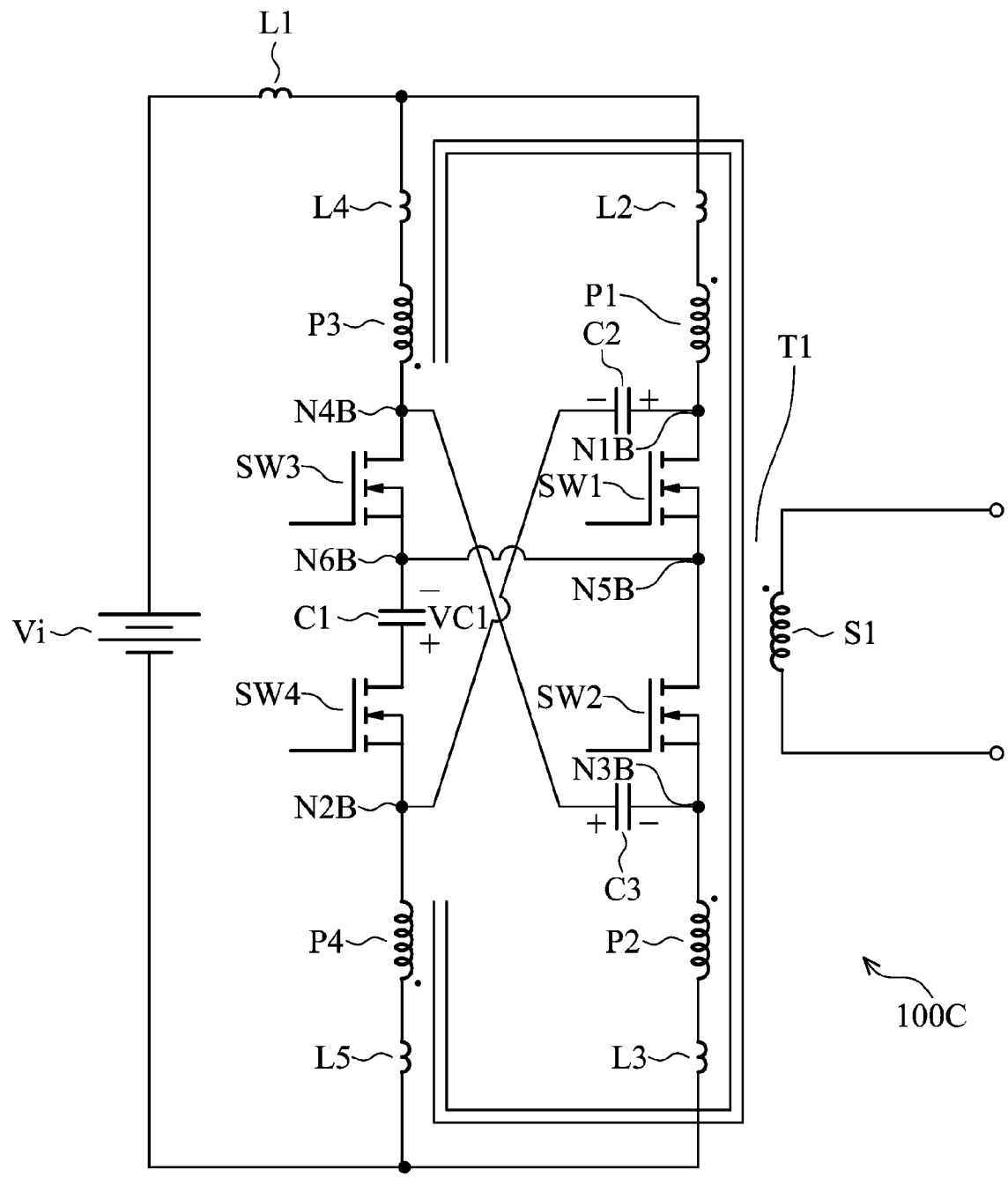
FIG. 7 shows another embodiment of the power converter according to the invention.

FIG. 7 shows another embodiment of the power converter according to the invention. As shown, a power converter 100C comprises a transformer T1, switching elements SW1~SW4, capacitors C1~C3, and inductors L1~L5.

The transformer T1 comprises four primary windings P1~P4 and at least one secondary winding S1. The inductor L2, the primary winding P1, the switching element SW1, the switching element SW2, the primary P2 and the inductor L3 are connected in series to form a first series circuit, and the inductor L4, the primary winding P3, the switching element SW3, the capacitor C1, the switching element SW4, the primary winding P4 and inductor L5 are connected in series to form a second series circuit. The inductor L1 is connected between a first electrode (i.e. the positive electrode) of a direct current (DC) power supply Vi and the inductors L2 and L4 in the first and second series circuits, and the inductor L1 is connected to the DC power supply Vi in series. Both of the first and second series circuits are connected to the series-connected DC power supply Vi and inductor L1 in parallel. The inductors L1~L5 can be parasitic inductors or external inductors.

The inductor L2 is connected between the inductor L1 and the primary winding P1. The primary winding P1 has a first terminal connected to the inductor L2 and a second terminal connected to a node N1B. The switching element SW1 has a first terminal connected to the node N1B, and a second terminal connected to a node N5B, and the switching element SW2 has a first terminal connected to the node N5B and a second terminal connected to a node N3B. The primary winding P2 has a first terminal connected to the node N3B and a second terminal connected to the inductor L3, and the inductor L3 is connected between the second terminal of the primary winding P2 and a second electrode (i.e. the negative electrode) of the DC power supply Vi.

The inductor L4 is connected between the inductor L1 and the primary winding P3, and the primary winding P3 has a first terminal connected to the inductor L4 and a second terminal connected to a node N4B. The switching element SW3 has a first terminal connected to the node N4B, and a second terminal connected to a node N6B, and the capacitor C1 is connected between the node N6B and the switching element SW4. The switching element SW4 has a first terminal connected to the capacitor C1 and a second terminal connected to a node N2B, the primary winding P4 has a first terminal connected to the node N2B and a second connected to the inductor L5, and the inductor L5 is connected between the primary winding P4 and the second electrode of the DC power supply Vi. In addition, the capacitor C2 is connected between the nodes N1B and N2B, and the capacitor C3 is connected between the nodes N3B and N4B, and the nodes N5B and N6B are connected together. The power converter 100C can also be operated in the asymmetric mode with reference to FIG. 3. It should be noted that, when the switching elements S1 SW4 are turned off, the DC power supply Vi, the inductor L1, the inductor L2, the primary winding P1, the capacitor C2, the primary winding P4, and the inductor L5 form a loop. The DC power supply Vi, the inductor L1, the inductor L4, the primary winding P3, the capacitor C3, the primary winding P2, and the inductor L3 form another loop. At this time, because polarity of the primaries P1 and P4 are opposite, the average voltage of the capacitor C2 can be equal to the DC power supply Vi. Similarly, because the polarity of the primaries P2 and P3 are opposite, the average voltage of the capacitor C3 can be equal to the DC power supply Vi. Operations of the power converter 100C when operating in the asymmetric mode are described hereafter.

[t0,t1]

At time t0, the switching elements SW1 and SW2 are turned on under zero-voltage-switching condition and the switching elements SW3 and SW4 are remained off. The DC power supply Vi, the inductors L1 and L2, the primary winding P1, the switching elements SW1 and SW2, and the primary winding P2 and the inductor L3 form a first loop. The capacitor C2, the switching elements SW1 and SW2, the primary winding P2, the inductors L3 and L5 and the primary winding P4 form a second loop, and the capacitor C3, the switching elements SW1 and SW2, the primary windings P1, the inductors L2 and L1 and the primary winding P3 form a third loop. The average voltages of the capacitors C2 and C3 act as two voltage sources, such that all primary windings P1~P4 are activated. Hence, the magnetizing currents of the transformer T1 increase linearly and the energy from the DC power supply Vi is partly delivered to the secondary winding S1. In addition, the capacitor C1 stores a voltage VC1. At this time, the voltage stress cross the switching element SW3 is the DC power supply Vi, and the voltage stress across the switching element SW4 is Vi+VC1.

[t1,t2]

At time t1, the switching elements SW1 and SW2 are turned off. The magnetizing currents discharge the parasitic capacitors of the switching elements SW3 and SW4. Finally, the parasitic capacitors of the switching elements SW3 and SW4 are discharged completely and the body diodes of which are turned on.

[t2, t3]

The switching elements SW3 and SW4 are turned on under a zero-voltage-switching condition. The DC power supply Vi, the inductors L1 and L4, the primary winding P3, the switching elements SW3 and SW4, the primary winding P4 and the inductor L5 form a first loop. The capacitor C2, the primary winding P1, the inductors L2 and L4 and the primary winding P3, the switching element SW3, the capacitor C1 and the switching element SW4 form a second loop. The capacitor C3, the switching element SW3, the capacitor C1, the switching element SW4, the primary winding P4, the inductors L3 and L5 and the primary winding P2 form a third loop. The voltage −(Vi+VC1) is applied to the primary windings P1~P4, such that all primary windings P1~P4 are activated and the energy from the DC power supply Vi is partly delivered to the secondary winding S1. At this time, the voltage stress cross the switching element SW2 is the DC power supply Vi, and the voltage stress across the switching element SW1 is Vi+VC1

[t3, t4]

At time t3, the switching elements SW3 and SW4 are turned off. The magnetizing currents discharge the parasitic capacitors of the switching elements SW1 and SW2. Finally, the parasitic capacitors of the switching elements SW1 and SW2 are discharged completely and the body diodes of which are turned on. At time t4, the switching SW1 and SW2 are turned on to resume a new switching cycle.

The power converter 100C can also be operated in a phase shift mode by a phase shift modulation controller. Operations of the power converter 100C operated in the phase shift mode are similar to that in the asymmetrical mode, and thus are omitted for briefly.

Figure 8:
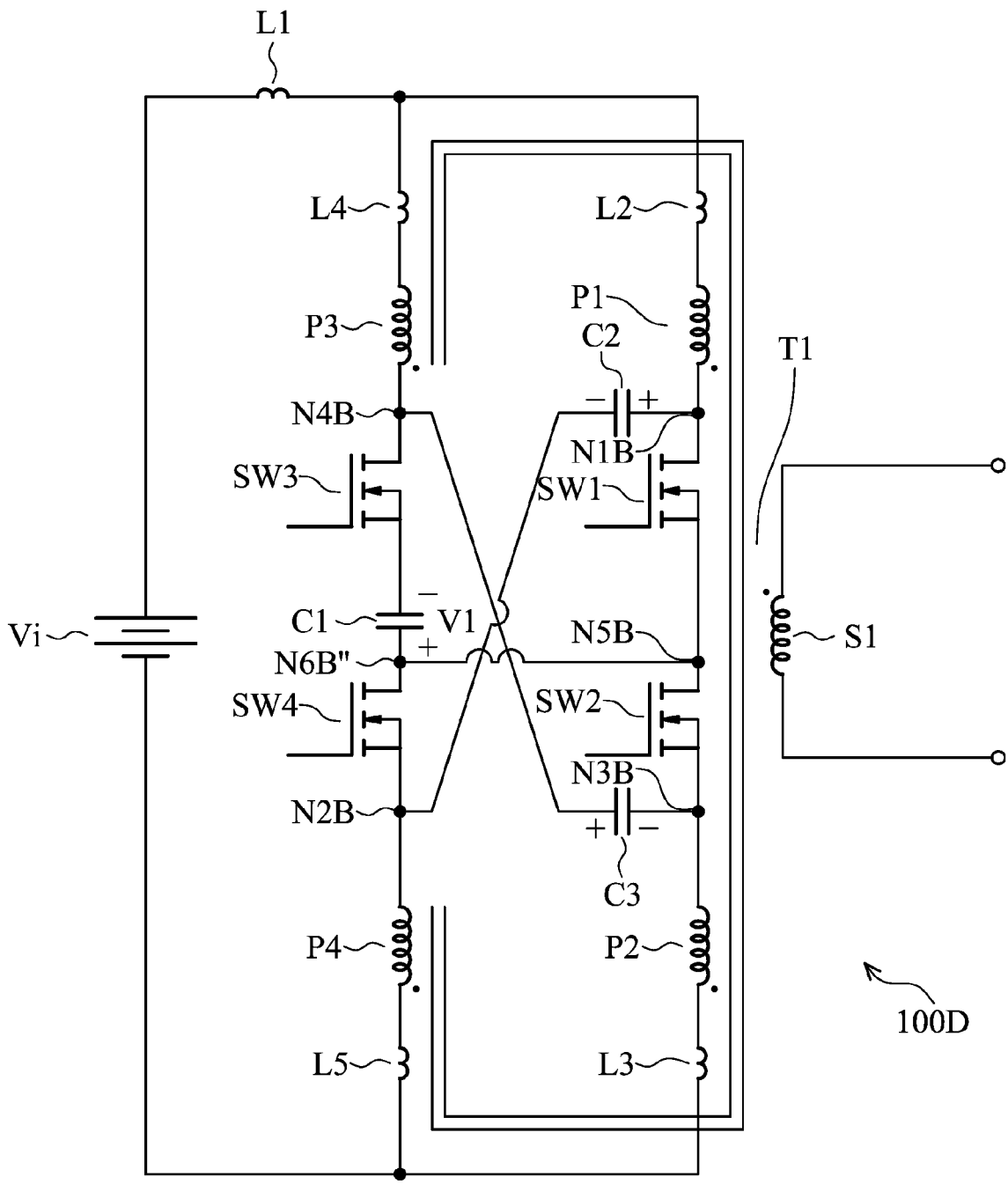
FIG. 8 shows another embodiment of the power converter according to the invention.

FIG. 8 shows another embodiment of the power converter according to the invention. As shown, the power converter 100D is similar to the power converter 100C, differing only, in that the node N5B is connected to the node N6B" between the capacitor C1 and the switching element SW4 rather than the node N6B between the capacitor C1 and the switching element SW3. Operations of the power converter 100D are similar to those of power converter 100C, and thus are omitted for simplification.

Figure 9:
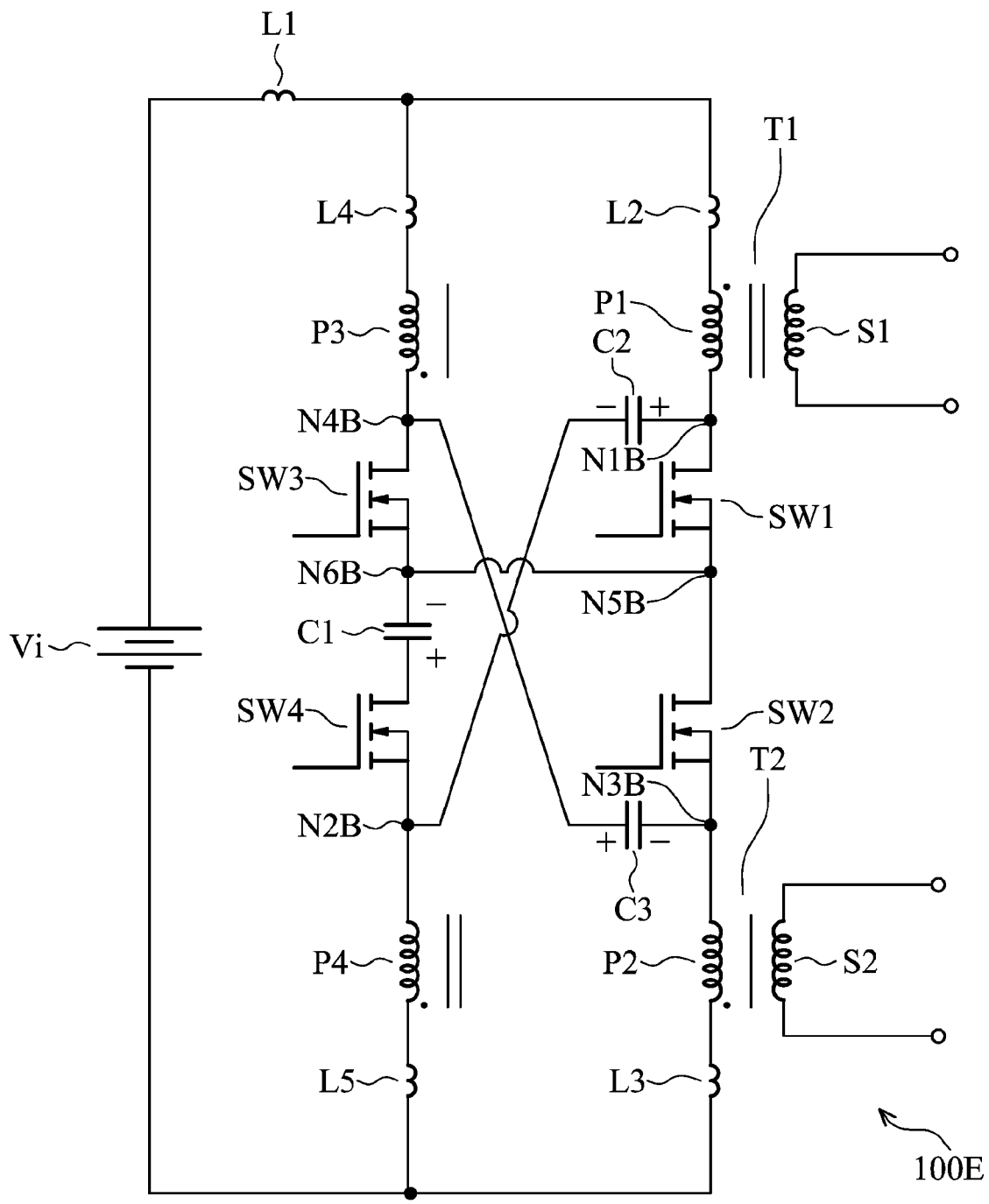
FIG. 9 shows another embodiment of the power converter according to the invention.

FIG. 9 shows another embodiment of the power converter according to the invention. As shown, the power converter 100E is similar to the power converter 100C, differing only, in that the transformer T1 is replaced by two transformers T1 and T2. The primary windings P1 and P4 are belonged to the transformer T1, and the primary windings P2 and P3 are belonged to the transformer T2. The transformer T1 further comprises at least one secondary winding S1 and the transformer T2 further comprises at least one secondary winding S2. Operations of the power converter 100D are similar to those of power converter 100C, and thus are omitted for simplification.

Figure 10:
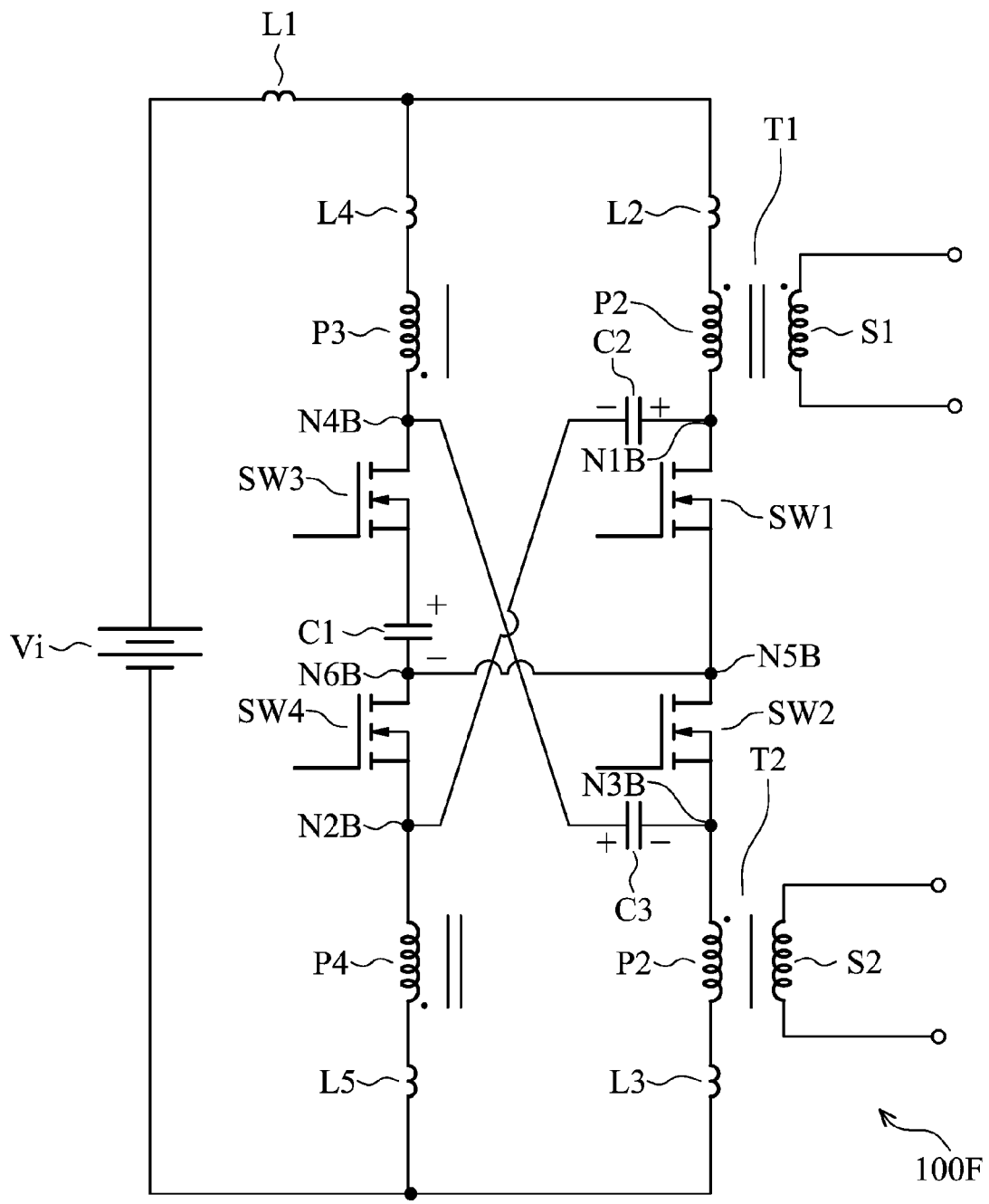
FIG. 10 shows another embodiment of the power converter according to the invention and FIGS. 11A~11D show the possible rectifier circuits applied to the embodiments according to the invention.
Figure 11A:
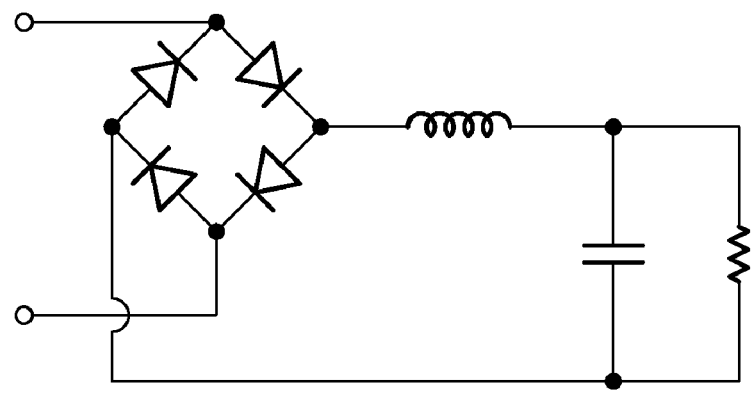
Figure 11B:
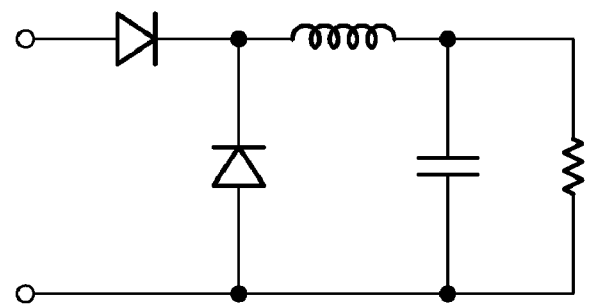
Figure 11C:
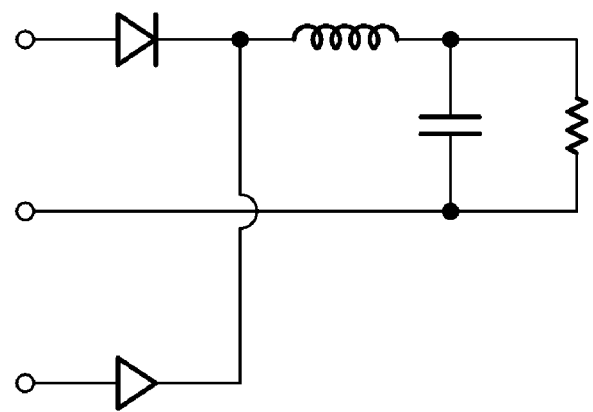
Figure 11D:
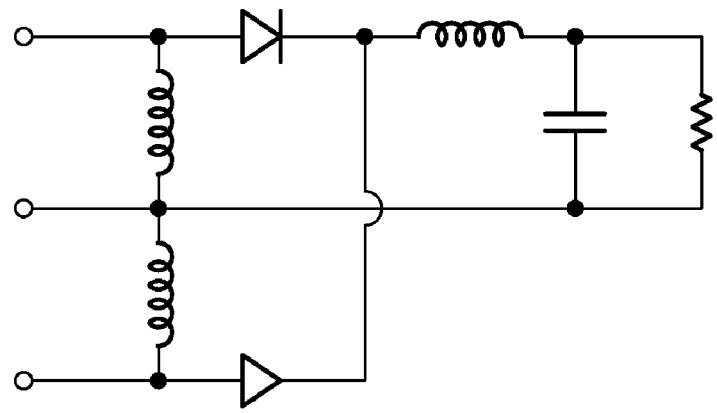

FIG. 10 shows another embodiment of the power converter according to the invention. As shown, the power converter 100F is similar to the power converter 100C, differing only, in that the node N5B is connected to the node N6B" between the capacitor C1 and the switching element SW4 rather than the node N6B between the capacitor C1 and the switching element SW3, and the transformer T1 is replaced by two transformers T1 and T2. The primary windings P1 and P4 are belonged to the transformer T1, and the primary windings P2 and P3 are belonged to the transformer T2. The transformer T1 further comprises at least one secondary winding S1 and the transformer T2 further comprises at least one secondary winding S2. Operations of the power converter 100F are similar to those of power converter 100C, and thus are omitted for simplification.

In addition, the power converters 100A~100F can also comprises an AC-DC conversion circuit connected to the secondary winding(s), converting the AC output at the secondary winding(s) into the DC voltage(s). FIGS. 11A~11D show the possible rectifier circuits applied to the embodiments according to the invention, but are not limited thereto.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A power converter, comprising:
    a first series circuit connected in parallel with a direct current (DC) power supply and comprising a first inductor, a first primary winding, a first switching element and a second switching element connected in series;
    a second series circuit connected in parallel with the DC power supply and comprising a third switching element, a first capacitor, a fourth switching element, a second primary winding and a second inductor connected in series; and
    a second capacitor connected between a first node within the first series circuit and a second node within the second series circuit, in which the first node is between the first primary winding and the first switching element, the second node is between the fourth switching element and the second primary winding, and a third node between the first and second switching elements is connected to a fourth node within the second series circuit.

2. The power converter as claimed in claim 1, wherein the first primary winding, the second primary winding and at least secondary winding form a transformer.

3. The power converter as claimed in claim 1, wherein the fourth node is a connection node between the third switching element and the first capacitor.

4. The power converter as claimed in claim 1, wherein the fourth node is a connection node between the first capacitor and the fourth switching element.

5. The power converter as claimed in claim 1, wherein the first and second inductors are parasitic inductors or external inductors.

6. The power converter as claimed in claim 1, further comprising a converter controller to control the switching elements in an asymmetrical mode.

7. The power converter as claimed in claim 1, further comprising a converter controller to control the switching elements in a phase shift mode.

8. The power converter as claimed in claim 1, wherein each of the switching elements comprises one MOSFET, one IGBT, one electromechanical switch, one micro-machined switch, or one other active semiconductor switch with a parallel-connected diode.

9. A power converter, comprising:
    a first inductor connected to a direct current (DC) power supply in series;
    a first series circuit connected in parallel with the series-connected DC power supply and first inductor, and comprising a second inductor, a first primary winding, a first switching element, a second switching element, a second primary winding and a third inductor connected in series;
    a second series circuit connected in parallel with the series-connected DC power supply and first inductor, and comprising a fourth inductor, a third primary winding, a third switching element, a first capacitor, a fourth switching element, a fourth primary winding and a fifth inductor connected in series;
    a second capacitor connected between a first node within the first series circuit and a second node within the second series circuit, in which the first node is between the first primary winding and the first switching element, and the second node is between the fourth switching element and the fourth primary winding; and
    a third capacitor connected between a third node within the first series circuit and a fourth node within the second series circuit, in which the third node is between the second switching element and the second primary winding, the fourth node is between the third primary winding and the third switching element, and a fifth node between the first and second switching elements is connected to a sixth node within the second series circuit.

10. The power converter as claimed in claim 9, wherein the sixth node is a connection node between the third switching element and the first capacitor.

11. The power converter as claimed in claim 9, wherein the sixth node is a connection node between the first capacitor and the fourth switching element.

12. The power converter as claimed in claim 9, wherein the first to the fifth inductors are parasitic inductors or external inductors.

13. The power converter as claimed in claim 9, the first to the fourth primary windings and at least secondary winding form a transformer.

14. The power converter as claimed in claim 9, the first primary winding, the fourth primary winding and a first secondary winding form a first transformer, and the second primary winding, the third primary winding and a second secondary winding form a second transformer.

15. The power converter as claimed in claim 9, further comprising a converter controller to control the switching elements in an asymmetrical mode.

16. The power converter as claimed in claim 9, further comprising a converter controller to control the switching elements in a phase shift mode.

17. The power converter as claimed in claim 9, wherein each of the switching elements comprises one MOSFET, one IGBT, one electromechanical switch, one micro-machined switch, or one other active semiconductor switch with a parallel-connected diode.

* * * * *